US006851063B1

(12) United States Patent
Boyle et al.

(10) Patent No.: US 6,851,063 B1
(45) Date of Patent: Feb. 1, 2005

(54) DIGITAL VIDEO RECORDER EMPLOYING A FILE SYSTEM ENCRYPTED USING A PSEUDO-RANDOM SEQUENCE GENERATED FROM A UNIQUE ID

(75) Inventors: William B. Boyle, Lake Forest, CA (US); Alan P. Rice, Santa Ana, CA (US)

(73) Assignees: Keen Personal Technologies, Inc., Lake Forest, CA (US); Keen Personal Media, Inc., Lake Forest, CA (US)

( * ) Notice: Subject to any disclaimer, the term of this patent is extended or adjusted under 35 U.S.C. 154(b) by 908 days.

(21) Appl. No.: 09/676,633

(22) Filed: Sep. 30, 2000

(51) Int. Cl.[7] .................................................. G06F 1/24
(52) U.S. Cl. ........................ 713/268; 713/232; 713/241
(58) Field of Search ................................ 713/268, 232, 713/241

(56) References Cited

U.S. PATENT DOCUMENTS

| | | | | |
|---|---|---|---|---|
| 5,392,289 A | * | 2/1995 | Varian | ......................... 714/707 |
| 5,592,555 A | | 1/1997 | Stewart | |
| 5,687,237 A | | 11/1997 | Naclerio | |
| 5,757,909 A | | 5/1998 | Park | |
| 5,883,958 A | | 3/1999 | Ishiburo et al. | |
| 5,923,814 A | * | 7/1999 | Boyce | ......................... 386/109 |
| 5,931,947 A | | 8/1999 | Burns et al. | |
| 6,061,451 A | | 5/2000 | Muratani et al. | |

OTHER PUBLICATIONS

Bennet Yee, J.D. Tygar, "Secure Coprocessors in Electronic Commerce Applications", First USENIX Workshop on Electronic Commerce, Jul. 11–12, 1995, 155–170.

Howard Gobioff, "Security for a High Performance Commodity Storage Subsystem", School of Computer Science, Carnegie Mellon University, CMU–CS–99–160, Jul. 1999, pp. 171–178.

Rodney Van Meter, Steve Hotz, Gregory Finn, "Derived Virtual Devices: A Secure Distributed File System Mechanism", In Proceedings of the Fifth NASA Goddard Space Flight Center Conference on Mass Storage Systems and Technologies, Sep. 1996.

Garth A. Gibson, David F. Nagle, Khalil Amiri, Fay W. Chang, Howard Gobioff, Erik Riedel, David Rochberg, and Jim Zelenka, "Filesystems for Network–Attached Secure Disks", Jul. 1997, 1–18, CMU–CS–97–118, School of Computer Science, Carnegie Mellon University, Pittsburgh, Pennsylvania.

(List continued on next page.)

*Primary Examiner*—Thomas R. Peeso
(74) *Attorney, Agent, or Firm*—Milad G. Shara, Esq.; Howard H. Sheerin, Esq.

(57) ABSTRACT

A digital video recorder (DVR) is disclosed comprising a unique ID, a hard disk drive (HDD) for storing a plurality of encrypted video programs and an encrypted file system, the encrypted file system comprising a plurality of encrypted file system entries for decrypting the plurality of video programs. The DVR further comprises host circuitry for interfacing with the HDD, the host circuitry comprising a cryptography facility for encrypting plaintext file system entries into the encrypted file system entries stored on the HDD, and for decrypting the encrypted file system entries read from the HDD into plaintext file system entries. The cryptography facility comprises a pseudo-random sequence generator, responsive to the unique ID, for generating a pseudo-random sequence. The cryptography facility further comprises an encoder for combining the pseudo-random sequence with the plaintext file system entries to generate the encrypted file system entries stored on the HDD, and a decoder for combining the pseudo-random sequence with the encrypted file system entries read from the HDD to generate the plaintext file system entries.

38 Claims, 6 Drawing Sheets

Howard Gobioff, Garth Gibson, and Doug Tygar, "Security for Network Attached Storage Devices", Oct. 23, 1997, 1–18, CMU–CS–97–185, School of Computer Science, Carnegie Mellon University, Pittsburgh, PA 15213.

"Digital Transmission License Agreement", www.dtcp.com.

"Digital Transmission Content Protection Specification", vol. 1, Revision 1.0, Apr. 12, 1999, www.dtcp.com.

"5C Digital Transmission Content Protection White Paper", Revision 1.0, Jul. 14, 1998, www.dtcp.com.

Steven Grossman, "Two–Chip Set Safeguards Digital Video Content", Electronic Design, Jun. 12, 2000, pp. 68–72.

* cited by examiner

US 6,851,063 B1

DIGITAL VIDEO RECORDER EMPLOYING A FILE SYSTEM ENCRYPTED USING A PSEUDO-RANDOM SEQUENCE GENERATED FROM A UNIQUE ID

BACKGROUND OF THE INVENTION

1. Field of the Invention

The present invention relates to digital video recorders. More particularly, the present invention relates to a digital video recorder employing a file system encrypted using a pseudo-random sequence generated from a unique ID.

2. Description of the Prior Art

Video cassette recorders (VCRs) in the past used a tape cassette storage medium to record video programs in analog form. Copyright protection with VCRs is not a significant concern since the quality of the video degrades when copied from one VCR to another. More recently, however, digital video recorders (DVRs) have been introduced which store video programs in digital form. Copyright protection with DVRs is a significant concern since the video reproduces without degradation when copied digitally from one DVR to another.

Prior art DVRs typically employ a conventional hard disk drive (HDD), such as an IDE hard disk drive, as the digital storage device since HDDs have sufficient capacity to store video content and are relatively inexpensive due to their prevalent use in personal computers (PCs). Rather than design and manufacture a customized HDD for the DVR market, DVRs are constructed similar to a PC, including DVR host circuitry for interfacing with a commodity HDD which reduces the cost of the DVR. This design, however, has subjected the copyrighted video programs to unauthorized reproduction, for example, by eavesdropping while the copyrighted content is transferred from the DVR host circuitry to the HDD, or by removing the HDD and installing it in another DVR or in a PC.

There is, therefore, a need to protect against unauthorized reproduction of copyrighted video programs in a DVR employing a cost effective, commodity HDD.

SUMMARY OF THE INVENTION

The present invention may be regarded as a digital video recorder (DVR) comprising a unique ID, a hard disk drive (HDD) for storing a plurality of encrypted video programs and an encrypted file system, the encrypted file system comprising a plurality of encrypted file system entries for decrypting the plurality of video programs. The DVR further comprises host circuitry for interfacing with the HDD, the host circuitry comprising a cryptography facility for encrypting plaintext file system entries into the encrypted file system entries stored on the HDD, and for decrypting the encrypted file system entries read from the HDD into plaintext file system entries. The cryptography facility comprises a pseudo-random sequence generator, responsive to the unique ID, for generating a pseudo-random sequence. The cryptography facility further comprises an encoder for combining the pseudo-random sequence with the plaintext file system entries to generate the encrypted file system entries stored on the HDD, and a decoder for combining the pseudo-random sequence with the encrypted file system entries read from the HDD to generate the plaintext file system entries.

In one embodiment the plaintext file system entry comprises a plaintext key for encrypting a plaintext video program into an encrypted video program stored on the HDD. The cryptography facility encrypts the plaintext video program into an encrypted video program stored on the HDD, and encrypts the plaintext key into an encrypted key stored on the HDD in an encrypted file system entry. During read back, the cryptography facility decrypts the encrypted key into the plaintext key, and the plaintext key is used to decrypt the encrypted video program.

In an alternative embodiment the pseudo-random sequence generator comprises a programmable file system (FS) polynomial. In one embodiment, the FS polynomial is programmed with coefficient values generated from the unique ID. In an alternative embodiment, the FS polynomial is programmed with a seed value generated from the unique ID. In yet another embodiment, the coefficient or seed values are generated using a programmable algorithm which can be periodically updated by an external entity to protect against system compromise.

In yet another embodiment, a plurality of distinct segment keys are used to encrypt a plaintext video program in segments. This embodiment provides further protection from unauthorized reproduction of the video program in that the entire set of segment keys must be discovered in order to successfully decrypt and copy the encrypted video program.

The present invention may also be regarded as a method of processing video programs in a digital video recorder comprising host circuitry and a hard disk drive (HDD) for storing encrypted video programs and encrypted file system entries for use in decrypting the encrypted video programs. A pseudo-random sequence is generated from a unique ID associated with the host circuitry. The pseudo-random sequence is combined with a plaintext file system entry to generate one of the encrypted file system entries. The encrypted file system entry is stored on the HDD and, during playback, read from the HDD. The pseudo-random sequence is combined with the encrypted file system entry read from the HDD to generate the plaintext file system entry.

DESCRIPTION OF THE PREFERRED EMBODIMENTS

Figure 1:
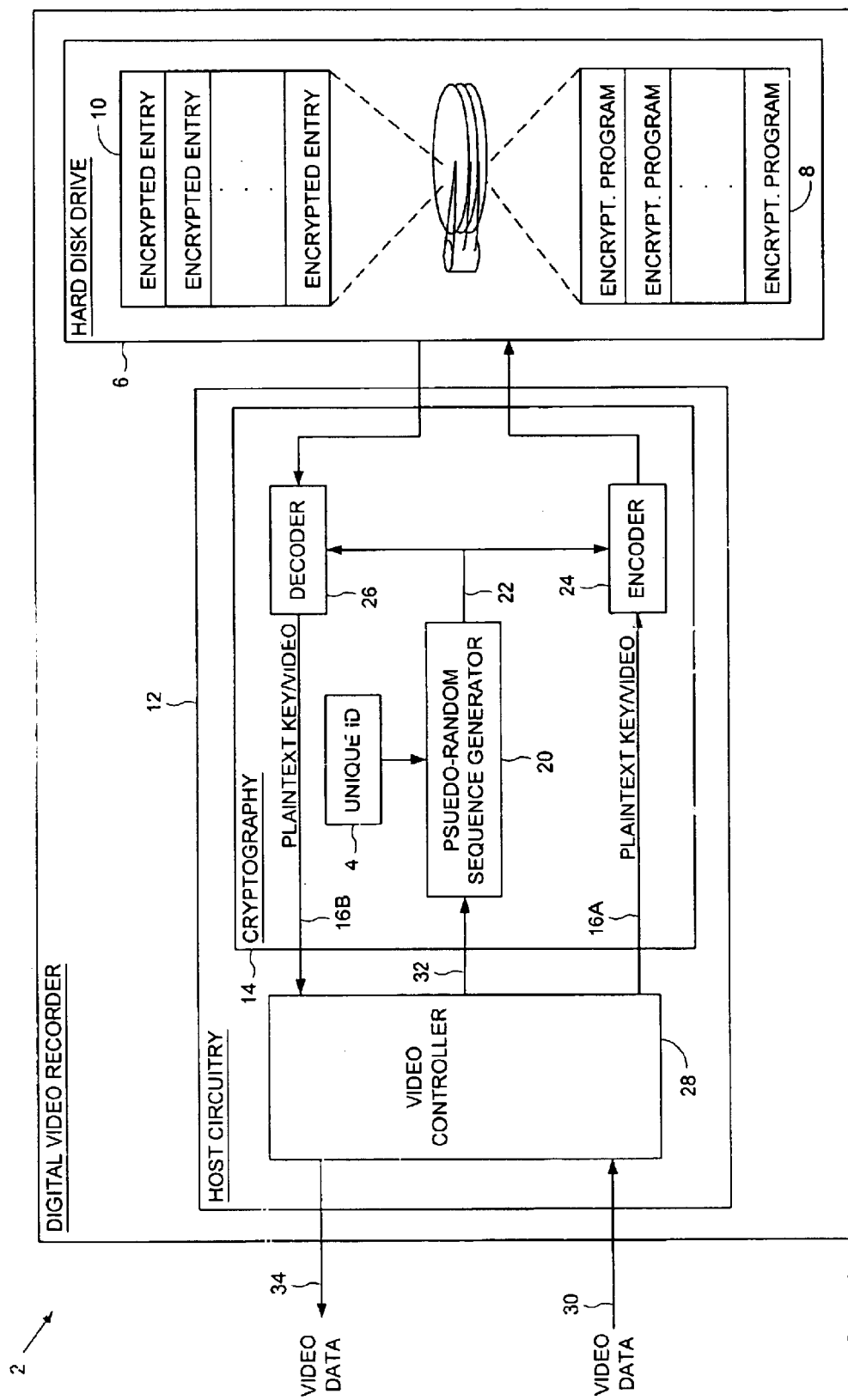
FIG. 1 shows a digital video recorder according to an embodiment of the present invention wherein video programs are stored in encrypted form on an HDD using plaintext keys which are also encrypted using a pseudo-random sequence generated from a unique ID and stored in encrypted file system entries on the HDD.

FIG. 1 shows a digital video recorder (DVR) 2 according to an embodiment of the present invention comprising a unique ID 4, a hard disk drive (HDD) 6 for storing a plurality of encrypted video programs 8 and an encrypted file system, the encrypted file system comprising a plurality of encrypted file system entries 10 for decrypting the plurality of encrypted video programs 8. The DVR 2 further comprises host circuitry 12 for interfacing with the HDD 6, the host circuitry 12 comprising a cryptography facility 14 for encrypting plaintext file system entries 16A into the encrypted file system entries 10 stored on the HDD 6, and for decrypting the encrypted file system entries 10 read from the HDD 6 into plaintext file system entries 16B. The cryptography facility 14 comprises a pseudo-random sequence generator 20, responsive to the unique ID 4, for generating a pseudo-random sequence 22. The cryptography facility 14 further comprises an encoder 24 for combining the pseudo-random sequence 22 with the plaintext file system entries 16A to generate the encrypted file system entries 10 stored on the HDD 6, and a decoder 26 for combining the pseudo-random sequence 22 with the encrypted file system entries 10 read from the HDD 6 to generate the plaintext file system entries 16B.

In one embodiment, the encoder 24 of FIG. 1 performs the encryption operation by XORing each element (e.g., byte) of the plaintext file system entry 16A with a corresponding element (e.g., byte) of the pseudo-random sequence 22. Similarly, the decoder 26 performs the decryption operation by XORing each element (e.g., byte) of the encrypted file system entry 10 with a corresponding element (e.g., byte) of the pseudo-random sequence 22 to generate the plaintext file system entry 16B.

The host circuitry 12 of FIG. 1 further comprises a video controller 28 for receiving video data 30 from an external entity (e.g., a cable or satellite). The video controller 28 generates control signals 32 for controlling the operation of the cryptography facility 14 when recording an encrypted video program 8, together with the encrypted file system entry 10 for decrypting the encrypted video program 8. The video controller also processes the decrypted file system entries 16B so that the encrypted video programs 8 can be decrypted and output as video data 34 to a display device. Because the file system entries 10 are stored in encrypted form relative to the unique ID 4 assigned to the DVR 2, the encrypted video programs 8 stored on the HDD 6 cannot be decrypted by connecting the HDD 6 to another DVR or to a PC. In effect, the HDD 6 is married to the host circuitry 12 of the DVR 2 through the unique ID 4 which protects against unauthorized copying. In addition, the encrypted file system entries 10 are transparent to the operation of the HDD 6 so that any conventional HDD 6 may be employed without modification.

In one embodiment, the plaintext file system entry 16A comprises a plaintext key for encrypting a plaintext video program into an encrypted video program 8 stored on the HDD 6. The cryptography facility 14 encrypts the plaintext video program into an encrypted video program 8 stored on the HDD 6, and encrypts the plaintext key into an encrypted key stored on the HDD 6 in an encrypted file system entry 10. In one embodiment, the encoder 24 combines the pseudo-random sequence 22 with the plaintext video program to generate the encrypted video program 8 stored on the HDD 6.

In another embodiment, the encrypted file system entry 10 comprises an encrypted key for decrypting an encrypted video program 8 read from the HDD 6 into a plaintext video program. The cryptography facility 14 decrypts the encrypted key read from the encrypted file system entry 10 into a plaintext key, and decrypts the encrypted video program 8 read from the HDD 6 using the plaintext key. In one embodiment, the decoder 26 combines the pseudo-random sequence 22 with the encrypted video program 8 read from the HDD 6 to generate the plaintext video program.

In one embodiment, the pseudo-random sequence generator 20 comprises a programmable file system (FS) polynomial for generating the pseudo-random sequence 22. In one embodiment, the programmable FS polynomial is programmed with coefficients which, in one embodiment, are generated by a coefficient generator responsive to the unique ID 4. In another embodiment, the programmable FS polynomial is programmed with a seed value which, in one embodiment, is generated by a seed value generator responsive to the unique ID 4.

Figure 2A:
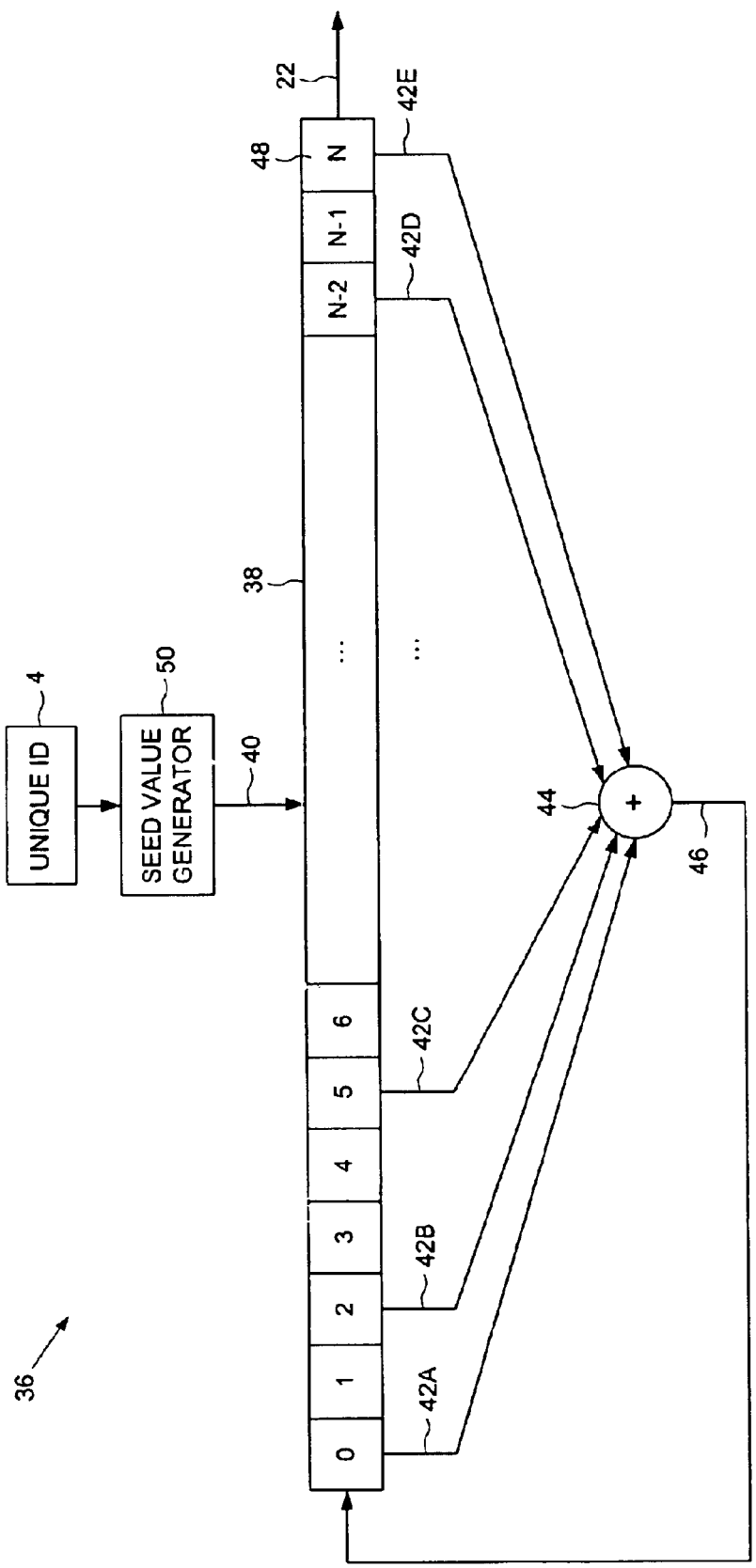
FIG. 2A shows a programmable file system (FS) polynomial implemented using a linear feedback shift register (LFSR) for generating the pseudo-random sequence of FIG. 1, wherein a seed value is generated for the LFSR from the unique ID.

FIG. 2A shows an embodiment of the present invention wherein the FS polynomial is implemented using a suitable linear feedback register (LFSR) 36. An LFSR may be implemented using a number of different configurations. The LFSR 36 of FIG. 2A comprises a shift register 38 comprising N storage elements which are initialized with a seed value 40 generated by a seed value generator 50 from the unique ID 4. A number of taps 42A–42E connect a corresponding number of the storage elements to an adder 44 for adding the values stored in the storage elements. The resulting sum 44 is fed back 46 to an input of the LFSR 36. The LFSR 36 is shifted from left to right, and the right most storage element 48 outputs each value of the pseudo-random sequence 22.

Figure 2B:
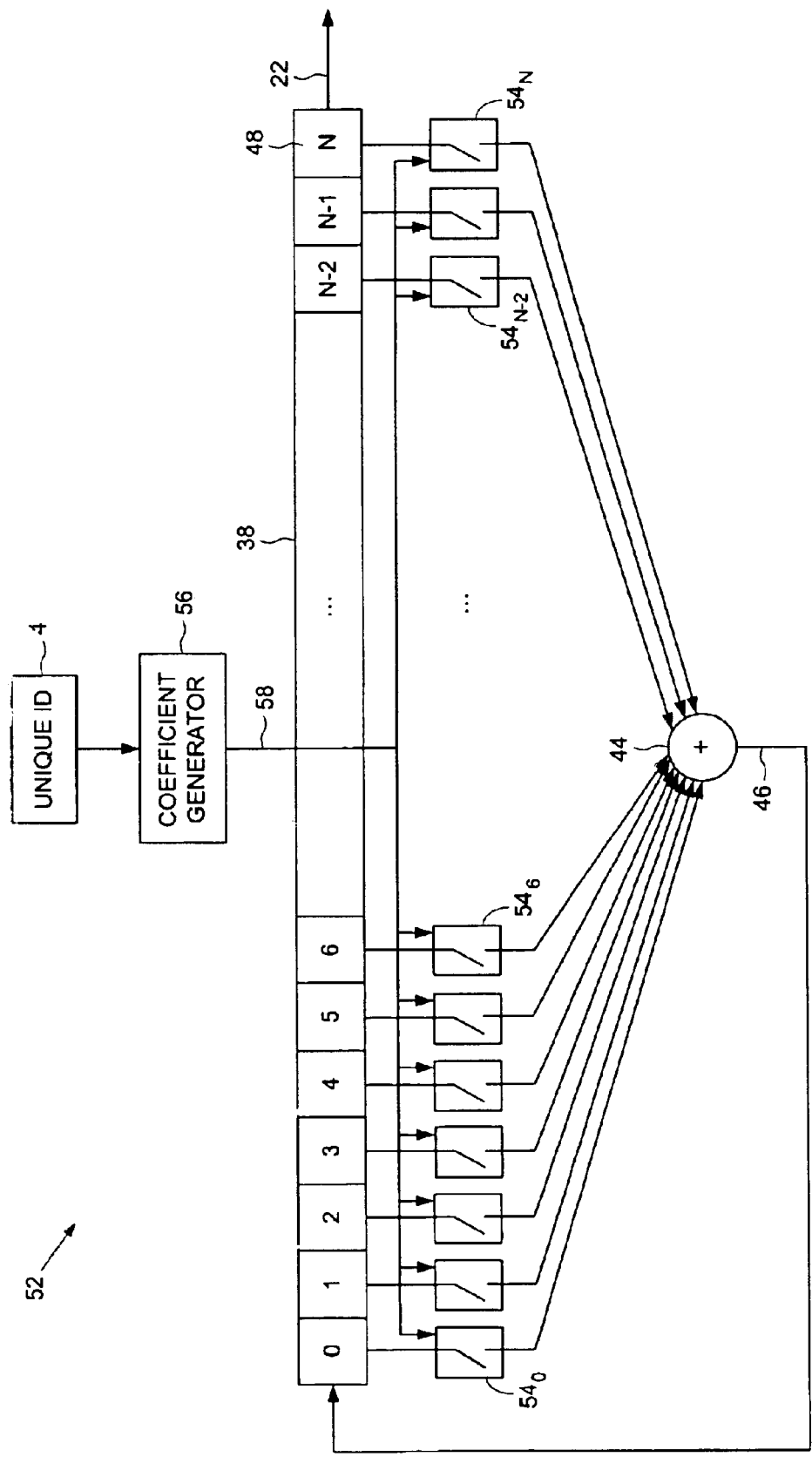
FIG. 2B shows a programmable FS polynomial implemented using a LFSR for generating the pseudo-random sequence of FIG. 1, wherein coefficient values are generated for the LFSR from the unique ID.

FIG. 2B shows an alternative embodiment of the present invention wherein the FS polynomial is implemented using an LFSR 52 comprising programmable coefficients $54_0$–$54_N$. A coefficient generator 56 generates coefficient values 58 for programming each of the programmable coefficients $54_0$–$54_N$. In the embodiment shown in FIG. 2B, the coefficients are binary valued and the programmable coefficients $54_0$–$54_N$ are implemented as switches.

In yet another embodiment of the present invention, the FS polynomial is implemented using an LFSR comprising both a programmable seed value and programmable coefficients values which are generated from the unique ID 4.

In one embodiment, the seed value generator 50 implements a function f(x), such as a polynomial, with the unique ID 4 as the input argument x and the seed value 40 the result. In another embodiment, the seed value generator 50 comprises a programmable algorithm for computing the seed value 40 from the unique ID 4. This embodiment allows a DVR manufacture to select the function f(x) for implementing a line of DVRs. This embodiment also allows an external entity to update the programmable algorithm to protect against system compromise. For example, in one embodiment the DVR 2 of FIG. 1 comprises network circuitry for connecting to a network (e.g., through a cable or satellite), and a system administrator on the network periodically changes the programmable algorithm in a random manner.

Thus, if an attacker discovers the algorithm used by the seed value generator 50 to generate the seed value 40, the compromise is only temporary until the system administrator updates the algorithm.

In another embodiment, the coefficient value generator 56 implements a plurality of functions f(x), such as a plurality of polynomials, with the unique ID as the input argument x and the coefficient values 58 the result of each function f(x). The coefficient value generator 56 may also implement a programmable algorithm for computing the coefficient values 58 to facilitate different DVR manufactures and to protect against system compromise as described above.

In another embodiment of the present invention, the seed value generator 50 comprises a seed table comprising a plurality of table entries, each table entry comprising a seed value. An index generator, responsive to the unique ID 4, generates an index into the seed table. In yet another embodiment, the coefficient value generator 56 comprises a coefficient table comprising a plurality of table entries, each table entry comprising coefficient values. An index generator, responsive to the unique ID 4, generates an index into the coefficient table.

Figure 3A:
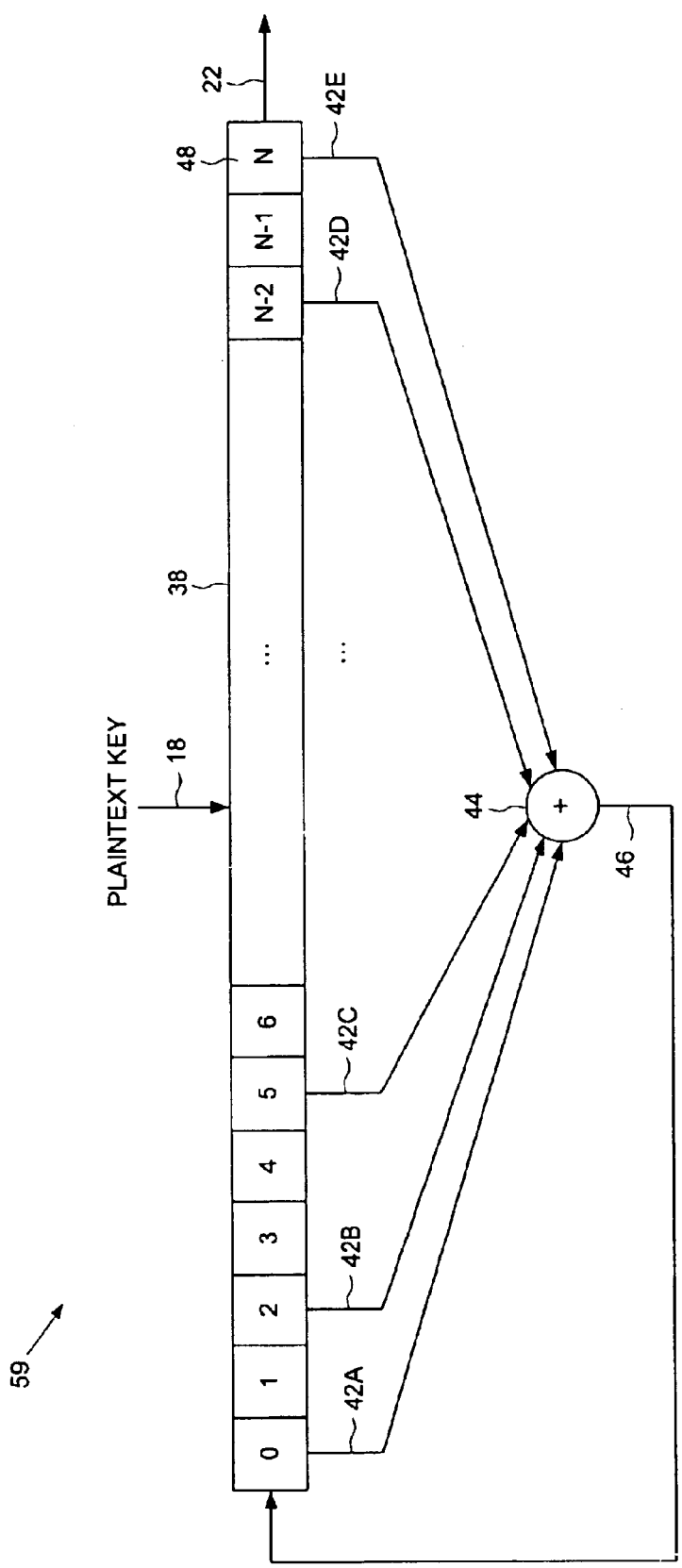
FIG. 3A shows an LFSR for generating a pseudo-random sequence for encrypting a plaintext video program using a plaintext key as a seed value for the LFSR.

FIG. 3A shows an alternative embodiment of the present invention as comprising a programmable LFSR 59 for generating a pseudo-random sequence 22 used to encrypt a plaintext video program into an encrypted video program 8 stored on the HDD 6. A plaintext key 18 is used as a seed value for the LFSR 59, where the plaintext key 18 is associated with the plaintext video program. In one embodiment, the plaintext key is derived from the filename or other attribute of the video program. In another embodiment, the plaintext key is generated randomly using any suitable method, for example, by reading a system clock value just prior to encrypting the plaintext video.

Figure 3B:
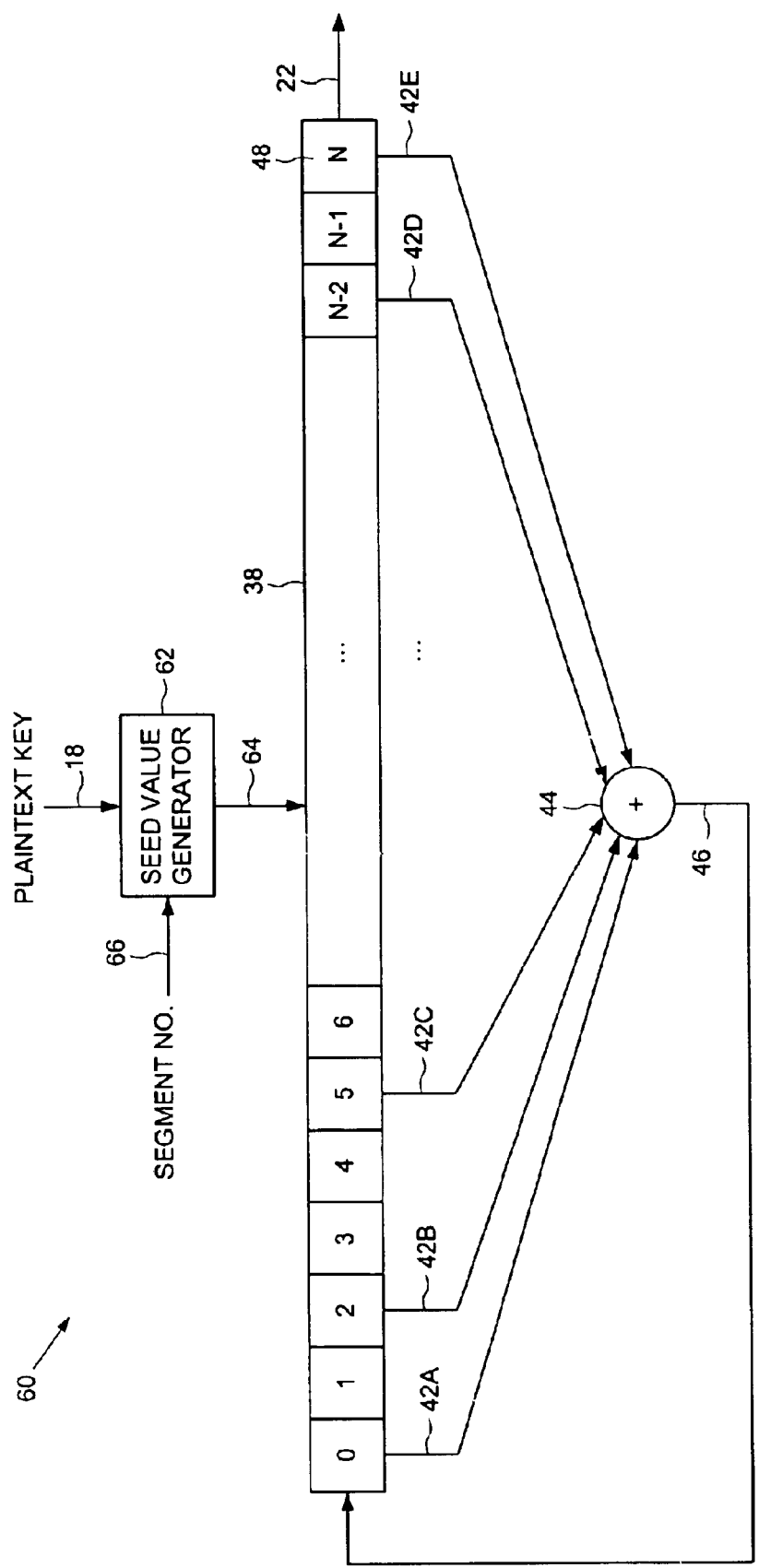
FIG. 3B shows an LFSR for generating a pseudo-random sequence for encrypting a plaintext video program using a plaintext key, wherein a seed value is generated from the plaintext key. In an alternative embodiment, a plurality of segment seed values are generated from the plaintext key wherein each segment seed value is used to encrypt a corresponding segment of the plaintext video program.

FIG. 3B shows an alternative embodiment of the present invention as comprising a programmable LFSR 60 for generating a pseudorandom sequence 22 used to encrypt a plaintext video program into an encrypted video program 8 stored on the HDD 6. A seed value generator 62 generates a seed value 64 used to initialize the shift register 38. The seed value 64 is generated from the plaintext key 18 used to encrypt the plaintext video program. In one embodiment, the plaintext video program is encrypted in segments, and the seed value generator 62 generates a distinct seed value 64 for each segment number 66. Each segment seed value 64 is essentially a distinct key for use in encrypting a corresponding segment of the plaintext video program. In this manner, compromise of a single key enables successful decrypting of only a segment of the encrypted video program.

In one embodiment, the plaintext key 18 comprises a plurality of segment keys for encrypting each segment of the plaintext video program, and the seed value generator 62 generates a corresponding seed value 64 for each segment key. In another embodiment, the segment keys are computed from the plaintext key 18, and the seed value generator 62 generates a corresponding seed value 64 for each computed segment key. In one embodiment, the seed value generator 62 comprises a function f(x,y) for computing the segment seed values 64 wherein the plaintext key 18 and segment number 66 are the input arguments x and y, and the segment seed value 64 is the result. Lookup tables may also be employed for generating the segment keys, and the algorithm for computing the segment keys may be programmably updated to facilitate different DVR manufactures and to protect against system compromise as described above.

Figure 3C:
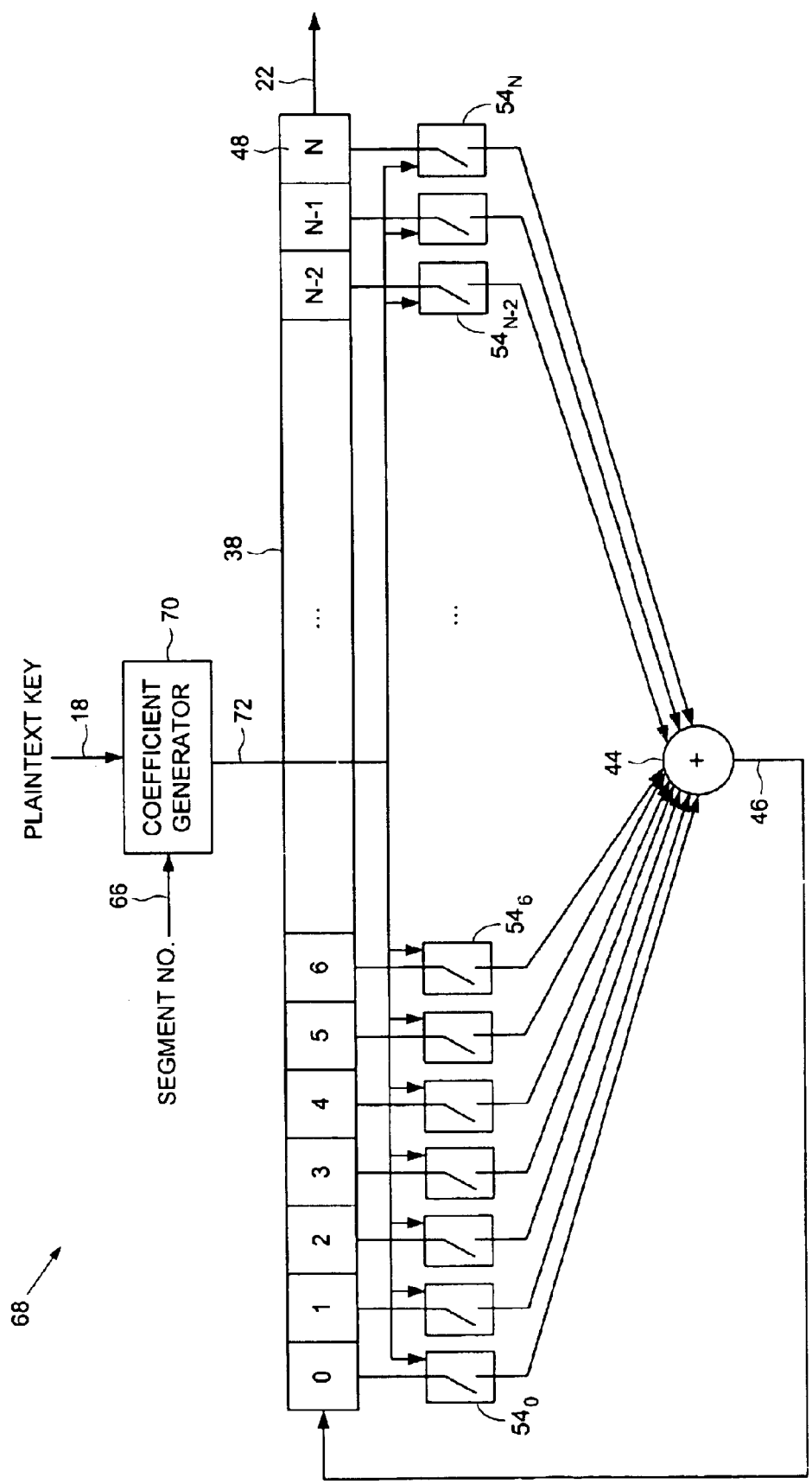
FIG. 3C shows an LFSR for generating a pseudo-random sequence for encrypting a plaintext video program using a plaintext key, wherein coefficient values are generated from the plaintext key. In an alternative embodiment, sets of coefficient values are generated from the plaintext key wherein each set of coefficient values is used to encrypt a corresponding segment of the plaintext video program.

FIG. 3C shows an alternative embodiment of the present invention as comprising a programmable LFSR 68 for generating a pseudo-random sequence 22 used to encode a plaintext video program into an encrypted video program 8 stored on the HDD 6. A coefficient value generator 70 generates a coefficient values 72 used to initialize the coefficients of the LFSR 68. The coefficient values 72 are generated from the plaintext key 18 used to encrypt the plaintext video program. In one embodiment, the plaintext video program is encrypted in segments, and the coefficient value generator 70 generates distinct coefficient values 72 for each segment number 66. Similar to the embodiment of FIG. 3B, each set of coefficient values 72 is essentially a distinct key for use in encrypting a corresponding segment of the plaintext video program so that compromise of a single key enables successful decrypting of only a segment of the encrypted video program.

In one embodiment, the plaintext key 18 comprises a plurality of segment keys for encrypting each segment of the plaintext video program, and the coefficient value generator 70 generates a set of coefficient values 72 for each segment key. In another embodiment, the segment keys are computed from the plaintext key 18, and the coefficient value generator 70 generates a corresponding set of coefficient values 72 for each computed segment key. In one embodiment, the coefficient value generator 70 comprises a function f(x,y) for computing the segment coefficient values 72 wherein the plaintext key 18 and segment number 66 are the input arguments x and y, and the segment coefficient values 72 are the result. Lookup tables may also be employed for generating the segment keys, and the algorithm for computing the segment keys may be programmably updated to facilitate different DVR manufactures and to protect against system compromise as described above.

In another embodiment, the LFSR 60 of FIG. 3B or the LFSR 68 of FIG. 3C is used to decrypt an encrypted video program 8 in segments using the segment keys. In one embodiment, the plaintext key 18 comprises a plurality of segment keys which are encrypted and stored as an encrypted file system entry 10 for use in decrypting the encrypted video program 8 during playback. In another embodiment, the plaintext key 18 is encrypted and stored as an encrypted file system entry 10. During playback, the encrypted key is decrypted into the plaintext key 18, and the plaintext key 18 is used to generate the segment keys for use in decrypting the encrypted video program 8 in segments.

In one embodiment, the HDD 6 comprises a disk having a plurality of data tracks, where each data track comprises a plurality of data sectors. In the embodiments of FIGS. 3B and 3C, a segment of a video program corresponds to a data sector. This simplifies the design since data is typically written to and read from a conventional HDD 6 in sector blocks. In one embodiment, the encrypted key for use in decrypting a corresponding sector is stored in the sector.

In another embodiment of the present invention, the unique ID 4 is implemented using tamper and inspection resistant circuitry to protect against discovery. In one embodiment, the host circuitry 12 and unique ID 4 are implemented within an integrated circuit (IC), and the unique ID 4 is buried, scattered or otherwise concealed within the IC using any suitable method. In yet another embodiment, at least part of the cryptography facility 14 (e.g., the seed value generator 62 of FIG. 3B or the coefficient value generator 70 of FIG. 3C) is implemented using tamper and inspection resistant circuitry to protect against discovery. An example of tamper and inspection resistant circuitry is disclosed in Tygar, J. D. and Yee, B. S., "Secure Coprocessors in Electronic Commerce Applications," Proceedings 1995 USENIX Electronic Commerce Workshop, 1995, New York, which is incorporated herein by reference.

The embodiments of the present invention may be implemented in circuitry or software or both. The circuitry and/or software may be static or field programmable as described above. Software embodiments comprise code segments embodied on a computer readable medium, such as a hard disk, floppy disk, compact disk (CD), digital video disk (DVD), or programmable memory (e.g., an EEPROM). The code segments may be embodied on the computer readable medium in any suitable form, such as source code segments, assembly code segments, or executable code segments.

We claim:

1. A digital video recorder comprising:
   (a) a unique ID;
   (b) a hard disk drive (HDD) for storing a plurality of encrypted video programs and an encrypted file system, the encrypted file system comprising a plurality of encrypted file system entries for decrypting the plurality of encrypted video programs;
   (c) host circuitry for interfacing with the HDD, the host circuitry comprising a cryptography facility for encrypting plaintext file system entries into the encrypted file system entries stored on the HDD, and for decrypting the encrypted file system entries read from the HDD into plaintext file system entries, the cryptography facility comprising:
   a pseudo-random sequence generator, responsive to the unique ID, for generating a pseudo-random sequence;
   an encoder for combining the pseudo-random sequence with the plaintext file system entries to generate the encrypted file system entries stored on the HDD; and
   a decoder for combining the pseudo-random sequence with the encrypted file system entries read from the HDD to generate the plaintext file system entries.

2. The digital video recorder as recited in claim 1, wherein:
   (a) the plaintext file system entry comprises a plaintext key for encrypting a plaintext video program into an encrypted video program stored on the HDD; and
   (b) the cryptography facility:
   uses the plaintext key to encrypt the plaintext video program into an encrypted video program stored on the HDD; and
   encrypts the plaintext key into an encrypted key stored in one of the encrypted file system entries on the HDD.

3. The digital video recorder as recited in claim 2, wherein the encoder combines the pseudo-random sequence with the plaintext video program to generate the encrypted video program stored on the HDD.

4. The digital video recorder as recited in claim 2, wherein:
   (a) the plaintext key comprises a plurality of segment keys; and
   (b) each segment key for encrypting a segment of the plaintext video program.

5. The digital video recorder as recited in claim 2, wherein:
   (c) a plurality of segment keys are generated from the plaintext key; and
   (d) each segment key for encrypting a segment of the plaintext video program.

6. The digital video recorder as recited in claim 1, wherein:
   (a) the encrypted file system entry comprises an encrypted key for decrypting an encrypted video program read from the HDD into a plaintext video program; and
   (b) the cryptography facility:
   decrypts the encrypted key read from the HDD into a plaintext key; and
   decrypts the encrypted video program read from the HDD using the plaintext key.

7. The digital video recorder as recited in claim 6, wherein the decoder combines the pseudo-random sequence with the encrypted video program read from the HDD to generate the plaintext video program.

8. The digital video recorder as recited in claim 1, wherein the pseudo-random sequence generator comprises a programmable file system (FS) polynomial for generating the pseudo-random sequence.

9. The digital video recorder as recited in claim 8, wherein the programmable FS polynomial is programmed with coefficient values.

10. The digital video recorder as recited in claim 9, further comprising a coefficient value generator for generating the coefficient values from the unique ID.

11. The digital video recorder as recited in claim 10, wherein the coefficient value generator comprises:
    (a) a coefficient table comprising a plurality of table entries, each table entry comprising coefficient values; and
    (b) an index generator, responsive to the unique ID, for generating an index into the coefficient table.

12. The digital video recorder as recited in claim 9, wherein the coefficient value generator comprises a programmable algorithm for generating the coefficient values from the unique ID.

13. The digital video recorder as recited in claim 12, wherein the host circuitry further comprises interface circuitry for receiving command information from an external entity to program the programmable algorithm.

14. The digital video recorder as recited in claim 8, wherein the programmable FS polynomial is programmed with a seed value.

15. The digital video recorder as recited in claim 14, further comprising a seed value generator for generating the seed value from the unique ID.

16. The digital video recorder as recited in claim 15, wherein the seed value generator comprises a programmable algorithm for generating the seed value from the unique ID.

17. The digital video recorder as recited in claim 16, wherein the host circuitry further comprises interface circuitry for receiving command information from an external entity to program the programmable algorithm.

18. The digital video recorder as recited in claim 15, wherein the seed value generator comprises:
    (a) a seed table comprising a plurality of table entries, each table entry comprising a seed value; and
    (b) an index generator, responsive to the unique ID, for generating an index into the seed table.

19. The digital video recorder as recited in claim 8, wherein the programmable FS polynomial comprises a programmable linear feedback shift register.

20. A method of processing video programs in a digital video recorder comprising host circuitry and a hard disk drive (HDD) for storing encrypted video programs and encrypted file system entries for use in decrypting the encrypted video programs, the method comprising the steps of:
    (a) generating a pseudo-random sequence from a unique ID associated with the host circuitry;
    (b) combining the pseudo-random sequence with a plaintext file system entry to generate 8 one of the encrypted file system entries;

(c) storing the encrypted file system entry on the HDD;

(d) reading the encrypted file system entry from the HDD; and (e) combining the pseudo-random sequence with the encrypted file system entry read from the HDD to generate the plaintext file system entry.

21. The method of processing video programs as recited in claim 20, wherein the plaintext file system entry comprises a plaintext key for encrypting a plaintext video program into an encrypted video program stored on the HDD, further comprising the steps of:

(a) using the plaintext key to encrypt the plaintext video program into an encrypted video program;

(b) storing the encrypted video program on the HDD;

(c) encrypting the plaintext key into an encrypted key; and (d) storing the encrypted key in one of the encrypted file system entries on the HDD.

22. The method of processing video programs as recited in claim 21, wherein the step of encrypting the plaintext video program comprises the step of combining the pseudo-random sequence with the plaintext video program.

23. The method of processing video programs as recited in claim 21, wherein the plaintext key comprises a plurality of segment keys, further comprising the step of encrypting segments of the plaintext video program using respective segment keys.

24. The method of processing video programs as recited in claim 21, further comprising the steps of:

(a) generating a plurality of segment keys from the plaintext key; and (b) encrypting segments of the plaintext video program using respective segment keys.

25. The method of processing video programs as recited in claim 20, wherein the encrypted file system entry comprises an encrypted key for decrypting an encrypted video program read from the HDD into a plaintext video program, further comprising the steps of:

(a) reading the encrypted key from the HDD;

(b) decrypting the encrypted key into a plaintext key;

(c) reading the encrypted video program from the HDD; and (d) decrypting the encrypted video program using the plaintext key.

26. The method of processing video programs as recited in claim 25, wherein the step of decrypting the encrypted video program comprises the step of combining the pseudo-random sequence with the encrypted video program.

27. The method of processing video programs as recited in claim 20, wherein the pseudo-random sequence is generated using a programmable file system (FS) polynomial.

28. The method of processing video programs as recited in claim 27, further comprising the step of programming the programmable FS polynomial with coefficient values.

29. The method of processing video programs as recited in claim 28, further comprising the step of generating the coefficient values from the unique ID.

30. The method of processing video programs as recited in claim 29, further comprising the step of generating the coefficient values from the unique ID using a programmable algorithm.

31. The method of processing video programs as recited in claim 30, further comprising the step of receiving command information from an external entity to program the programmable algorithm.

32. The method of processing video programs as recited in claim 29, wherein the step of generating the coefficient values comprises the step of generating an index from the unique ID, the index for indexing a coefficient table comprising a plurality of table entries, each table entry comprising coefficient values.

33. The method of processing video programs as recited in claim 27, further comprising the step of programming the programmable FS polynomial with a seed value.

34. The method of processing video programs as recited in claim 33, further comprising the step of generating the seed value from the unique ID.

35. The method of processing video programs as recited in claim 34, further comprising the step of generating the seed value from the unique ID using a programmable algorithm.

36. The method of processing video programs as recited in claim 35, further comprising the step of receiving command information from an external entity to program the programmable algorithm.

37. The method of processing video programs as recited in claim 34, wherein the step of generating the seed value comprises the step of generating an index from the unique ID, the index for indexing a seed table comprising a plurality of table entries, each table entry comprising a seed value.

38. The method of processing video programs as recited in claim 27, wherein the programmable FS polynomial comprises a programmable linear feedback shift register.

* * * * *